US012807826B2

(12) United States Patent
Cullmann et al.

(10) Patent No.: US 12,807,826 B2
(45) Date of Patent: Nov. 24, 2026

(54) PRINTING INK OR VARNISH COMPOSITION CONTAINING OXYMETHYLENE ETHER

(71) Applicant: HUBERGROUP DEUTSCHLAND GMBH, Kirchheim-Heimstetten (DE)

(72) Inventors: Michael Cullmann, Dachau (DE); Silke Siebeneiker, Sauerlach (DE); Ulrike Canella, Munich (DE); Sylvia Klausnitzer, Bruckmuehl (DE)

(73) Assignee: HUBERGROUP DEUTSCHLAND GMBH, Kirchheim-Heimstetten (DE)

( * ) Notice: Subject to any disclaimer, the term of this patent is extended or adjusted under 35 U.S.C. 154(b) by 1113 days.

(21) Appl. No.: 17/782,340

(22) PCT Filed: Dec. 4, 2020

(86) PCT No.: PCT/EP2020/084742

§ 371 (c)(1),
(2) Date: Jun. 3, 2022

(87) PCT Pub. No.: WO2021/110973

PCT Pub. Date: Jun. 10, 2021

(65) Prior Publication Data

US 2023/0002629 A1 Jan. 5, 2023

(30) Foreign Application Priority Data

Dec. 6, 2019 (EP) .................................... 19214056

(51) Int. Cl.
*C09D 11/033* (2014.01)
*C09D 11/10* (2014.01)

(52) U.S. Cl.
CPC ............ *C09D 11/033* (2013.01); *C09D 11/10* (2013.01)

(58) Field of Classification Search
CPC ........ C09D 11/033; C09D 11/10; C09D 11/36
See application file for complete search history.

(56) References Cited

U.S. PATENT DOCUMENTS

| | | | | |
|---|---|---|---|---|
| 2,561,513 | A | 7/1951 | Horback et al. | |
| 5,993,911 | A | 11/1999 | Brenke et al. | |
| 8,282,724 | B2 | 10/2012 | Goustiaux et al. | |
| 2007/0260094 | A1 | 11/2007 | Schelling et al. | |
| 2012/0048297 | A1* | 3/2012 | Adami | C09D 9/005 15/104.93 |
| 2015/0252201 | A1* | 9/2015 | Ortalano | C09D 7/41 427/256 |
| 2017/0015849 | A1 | 1/2017 | Oogaki et al. | |
| 2017/0190926 | A1 | 7/2017 | Saint-Romain | |
| 2020/0270437 | A1* | 8/2020 | Kulbaba | C08L 23/283 |
| 2022/0112148 | A1* | 4/2022 | Cai | C07C 41/56 |

FOREIGN PATENT DOCUMENTS

| | | | |
|---|---|---|---|
| EP | 3112428 | A1 | 1/2017 |
| EP | 3190160 | A1 | 7/2017 |
| JP | 2016113518 | A * | 6/2016 |
| WO | 2006045506 | A1 | 5/2006 |

OTHER PUBLICATIONS

English machine translation of JP-2016113518-A (Year: 2016).*

Zhenova, Anna, et al. "Solvent applications of short-chain oxymethylene dimethyl ether oligomers." ACS Sustainable Chemistry & Engineering, vol. 7, No. 17, Jul. 29, 2019, pp. 14834-14840, https://doi.org/10.1021/acssuschemeng.9b02895. (Year: 2019).*

Dahman et al., "Synthesekraftstoffe aus Biomasse", Erneuerbare Energie (Wiley-VCH, 2007) pp. 59-63.

Extended European Search Report based on European U.S. Appl. No. 19/214,056 (priority application) dated May 8, 2020.

International Preliminary Report on Patentability based on international patent application No. PCT/EP2020/084742.

International Search Report based on international patent application No. PCT/EP2020/084742 dated Feb. 22, 2021.

Zhenova et al., "Solvent Applications of Short-Chain Oxymethylene Ether Oligomers", ACS Sustainable Chem. Eng. (ACS, 2019) vol. 7, pp. 14834-14840.

* cited by examiner

*Primary Examiner* — Amber R Orlando
*Assistant Examiner* — Jeffrey Eugene Barzach
(74) *Attorney, Agent, or Firm* — Robert S. Lelkes; LELKES IP

(57) ABSTRACT

The present invention relates to a printing ink composition or varnish composition containing a binder component and a solvent component, wherein the solvent component comprises at least one oxymethylene ether and preferably at least one oxymethylene ether according to the general formula (I) $CH_3[OCH_2]_nOCH_3$, wherein n is an integer of 2 to 7.

11 Claims, No Drawings

PRINTING INK OR VARNISH COMPOSITION CONTAINING OXYMETHYLENE ETHER

The present invention relates to a printing ink composition or varnish composition, which is suitable to be used for any kind of printing technique, such as for offset printing.

Printing inks usually contain pigment, binder, solvent and several additives. While the pigment is responsible for the color of the dried printing ink, the solvent has the function to keep the binder and pigment liquid before the printing ink is allowed to dry. During the drying of the printing ink, the solvent evaporates or permeates into the substrate and the binder connects on account of its crosslinking and/or gluing properties the pigment of the printing ink with the printed substrate. In other words, the purpose of the binder is to completely encase the pigments and to fix the pigments on the printed substrate. Printing varnish compositions are composed likewise to the printing ink compositions except that printing varnish compositions do not contain pigment.

A plurality of printing techniques is known, such as offset printing, lithography printing, intaglio printing, flexographic printing, gravure printing and the like. The commercially available printing ink compositions and varnish compositions are tailored concerning their compositions so as to comply with the specific requirements of the printing technique(s) for which they are offered, such as an optimal viscosity for the printing technique(s), a good dissolution of the binder component, an excellent oxidation resistivity, a suitable boiling point and the like. On account of these reasons, the types of binders and solvents used in a printing ink composition and varnish composition depend on the printing technique, for which they are offered. For instance, sheet-fed offset printing ink/varnish compositions typically contain as solvent vegetable oils and/or fatty acid esters, whereas web offset printing ink/varnish compositions usually contain mineral oils or vegetable oils and gravure as well as flexographic printing ink/varnish compositions usually contain alcohols or esters as solvent.

However, any of the solvents usually included in printing ink/varnish compositions has drawbacks. Mineral oils and lower alcohols are flammable and irritating. Moreover, mineral oils are fossil resources. Other solvents, such as vegetable oils, are nutrition and therefore ethically critical as long as starvation exists. Moreover, most of the known solvents used in commercial printing ink/varnish compositions are not carbon dioxide neutrally producible.

In view thereof, the object underlying the present invention is to provide a printing ink composition or varnish composition, which comprises a solvent which is not harmful, non-toxic and particularly non-carcinogen, which has a comparably high flashpoint, which is easily disposable, which is not a nutrition and which is carbon dioxide neutrally producible, but which nevertheless is perfectly well suitable for printing ink/varnish compositions designed for established printing techniques, such as offset printing, flexographic printing, intaglio printing and others.

In accordance with the present invention, this object is satisfied by providing a printing ink composition or varnish composition containing a binder component and a solvent component, wherein the solvent component comprises at least one oxymethylene ether.

This solution bases on the surprising finding that oxymethylene ethers, which are currently evaluated as diesel substitute material, have the properties required for a solvent of a printing ink composition or varnish composition, such as a suitable viscosity, a good dissolution of those binder components typically included in printing ink/varnish compositions, an excellent oxidation resistivity, a suitable boiling point and the like. Moreover, oxymethylene ethers are non-toxic and particularly non-carcinogen, have a suitable volatility and flashpoint, if they are flammable at all. Furthermore, they are easily disposable, since they are usually classified in water hazard class 1. In addition, oxymethylene ethers are no nutrition and thus do not stand in competition of being used as human or pet food. Apart from that, oxymethylene ethers may be easily produced for instance from carbon dioxide, hydrogen and methanol and may be even produced from biomass, in particular from waste material in agriculture and forestry, which is no nutrition. Consequently, oxymethylene ethers produced in this way are no competition to the food production and may be produced with green electricity from renewable resources and carbon dioxide neutrally. Finally, oxymethylene ethers offer a suitable migration potential in typical food package substrates, such as paper, cardboard, films and metal foils, and are therefore particularly suitable for being used in printing ink/varnish compositions designed to be used for printing food packagings.

Preferably, the at least one oxymethylene ether included in the solvent component of the printing ink composition or varnish in accordance with the present invention is an oxymethylene dialkyl ether, such as an oxymethylene dimethyl ether, an oxymethylene diethyl ether, an oxymethylene dipropyl ether or an oxymethylene dibutyl ether. However, it is preferred that the at least one oxymethylene ether is an oxymethylene dimethyl ether.

It has been found that in particular oxymethylene ethers having a small or medium length have the aforementioned characteristics in good balance. In accordance with a particularly preferred embodiment of the present invention, it is therefore proposed that the solvent component of the printing ink composition or varnish composition in accordance with the present invention comprises at least one oxymethylene ether according to the general formula (I):

$$CH_3[OCH_2]_nOCH_3,$$

wherein n is an integer of 1 to 10, preferably 2 to 10 and more preferably 2 to 7.

The synthesis of oxymethylene ethers in general and in particular of those with the aforementioned general formula (I) is known. For instance, they may be synthesized via an aqueous synthesis route by an acidic catalyzed reaction of methanol and formaldehyde or via an anhydrous synthesis route by an acidic catalyzed reaction of trioxane and methylal. A method for synthesizing oxymethylene ethers according to the general formula (I) with n being 2 to 10 via the aforementioned anhydrous synthesis route is for example described in WO 2006/045506 A1. In particular, the oxymethylene ethers may be produced with a carbon dioxide neutrally process from waste material derived from renewable raw material, such as it is described by Nicolaus Dahmen et al. in “Erneuerbare Energie”, herausgegeben von Thomas Bührke and Roland Wengenmayr im WILEY-VCH Verlag GmbH & Co. KGaA, Weinheim, 2007, ISBN: 978-3-527-40727-9, Seiten 59 bis 63. The synthesized oxymethylene ethers may then be purified by pervaporation and/or distillation.

In accordance with the present invention, the printing ink composition or varnish composition contains a solvent component, which includes at least one oxymethylene ether species. If not completely purified, oxymethylene ether usually contains two or more oxymethylene ether molecules with a different chain length. For instance, if oxymethylene ether according to the general formula (I) with n being 3 is synthesized, typically a mixture of several oxymethylene ethers will be obtained, wherein oxymethylene ether with n being 3 is the main component and oxymethylene ethers with n being 2, 4 and 5 are by-products. By purification for instance via distillation, the content of the target compound oxymethylene ether with n being 3 in the mixture may be increased up to more than 99% by weight. In accordance with the present invention an oxymethylene ether containing at least 95% by weight and preferably at least 95% by weight of a certain molecule length, such as of the general formula (I) with n being 3, is considered as pure oxymethylene ether, i.e. in this example as oxymethylene ether with n being 3, and not as mixture. However, if at least 5% by weight of oxymethylene ether molecules with a different molecule length are contained, the component is considered to be a mixture of at least two different oxymethylene ethers.

In particular when a mixture of two or more different oxymethylene ethers is used, it is preferred that the solvent component of the printing ink composition or varnish composition in accordance with the present invention comprises oxymethylene ether having a weight average molecular weight of 106 to 256 g/mol. In accordance with the present invention, the weight-average molecular weight of oxymethylene ethers is determined by mass spectroscopy or by gas chromatography-mass spectrometry (GC-MS).

Moreover, it is preferred that the oxymethylene ether has a boiling point at 23° C. of 200 to 350° C.

In a further development of the idea of the present invention it is proposed that the printing ink composition or varnish composition comprises 5 to 90% by weight and preferably 30 to 85% by weight of solvent component based on the total weight of the printing ink composition or varnish composition. The solvent component is defined in the present invention to comprise any solvent contained in the printing ink composition or varnish composition, irrespective of whether the solvent is for dissolving the binder resin or other components. In the field of offset printing, solvent is sometimes considered as part of the binder. In accordance with the present invention, the binder component is the sum of all binder resins included in the printing ink composition or varnish composition, whereas the solvent component is the sum of all solvents included in the printing ink composition or varnish composition.

In order to largely achieve the effects of the present invention, it is preferred that the solvent component comprises at least 20% by weight, more preferably at least 50% by weight, even more preferably at least 70% by weight and most preferably at least 90% by weight of at least one oxymethylene ether.

In accordance with a particular preferred embodiment of the present invention, the solvent component of the printing ink composition or varnish composition consists of at least one oxymethylene ether, i.e. the solvent does not contain any other solvent except for the one or more oxymethylene ethers. In particular, the solvent and in fact the printing ink preferably does not contain any cyclic ester, any oxyethylene dialkylether or any oxypropylene dialkylether.

In accordance with an alternative, less preferred embodiment of the present invention, the solvent component of the printing ink composition or varnish composition comprises in addition to one or more oxymethylene ethers one or more other solvents. In this embodiment, the solvent component of the printing ink composition or varnish composition comprises preferably 20 to 95% by weight and more preferably 50 to 80% by weight of at least one oxymethylene ether and the remainder to 100% by weight of one or more solvents being selected from the group consisting of mineral oils, vegetable oils, fatty acid esters being different from vegetable oils, alcohols, esters, ethers, glycols, cyclic or linear hydrocarbons, ketones, lactones, alkanes, aromatic hydrocarbons, aromatic compounds and arbitrary combinations of two or more of the aforementioned solvents. However, preferably the solvent does not contain any cyclic ester, any oxyethylene dialkylether or any oxypropylene dialkylether.

The present invention is not particularly limited concerning the chemical nature and the content of binder in the printing ink composition or varnish composition. Good results are in particular obtained, when the printing ink composition or varnish composition comprises 10 to 70% by weight and more preferably 10 to 45% by weight of binder component based on the total weight of the printing ink composition or varnish composition. Again, the binder component is according to the present invention the sum of all binder resins included in the printing ink composition or varnish composition, whereas any kind of solvent, even if it is contained for dissolving the binder resin, is not considered in the present invention as part of the binder component, but as part of the solvent component.

Suitable examples for the ingredient(s) of the binder component are binders being selected from the group consisting of polyesters, polyethers, polyurethanes, urethane-modified resins, polyamide resins, polyacrylates, maleic resins, rosin modified fumaric resins, collophonium resins, dimerized and polymerized rosins, rosin esters, tallic resins, tall oil based resins, ketonic resins, aldehyde resins, alkyd resins, collophonium modified phenolic resins, hydrocarbon-resin modified phenolic resins, hydrocarbon resins, modified hydrocarbon resins, maleic modified resins, silicates, silicones, phenolic resins, urea urethane resins, melamine resins, epoxy resins, polyterpene resins, shellac, copal, dammar, lignin derivatives, natural resins, poly-vinylalcohols, polyvinylethers, polyvinylacetates, vinylacetate copolymers, polyvinylchlorides, polyvinylpropionates, polyvinylbutyrates, polymethacrylates, polystyrenes, styrene-modified resins, styreneacrylate resins, polyolefines, coumarone-indene resins, aromatic formaldehyde resins, carbamide acid resins, sulfonamide resins, chlorinated resins, nitrocellulose, ethylcellulose, CAB (cellulose acetate butyrate), CAP (cellulose acetate propionate), cellulose compounds, acrylate resins, amino acrylic resins, aminopolyester resins, asphalt, Ca/Mg resinates, rubbers, polysaccharides, polyol/iscocyanate compounds, temperature curing resins and arbitrary combinations of two or more of the aforementioned binders.

Furthermore, the printing ink composition or varnish composition may contain one or more additives. Examples for such additives are those selected from the group consisting of rheological additives, adhesives, defoamers, slip additives, gloss additives, waxes, wetting agents, levelling agents, curing agents, chelating agents, inhibitors, desiccants, stabilizers, emulsifiers, abrasions resistance additives, plasticizers, antistatic additives, light protection agents, matting agents, fillers, cross-linking agents and arbitrary combinations of two or more of the aforementioned additives.

The total amount of additives is preferably more than 0 to 15% by weight based on the total amount of the printing ink composition or varnish composition.

If the composition of the present invention is a printing ink composition, it includes one or more pigments. Preferably, the printing ink composition comprises 1 to 50% by weight and preferably 3 to 35% by weight of one or more pigments.

The printing ink composition or varnish composition may be formulated so as to be suitable for any known printing technique, such as offset printing, lithography printing, intaglio printing, flexographic printing, gravure printing, screen printing, digital printing, inkjet printing, pad printing, transfer printing, letter printing, oil-based inkjet printing, solvent based inkjet printing and the like.

According to a particular preferred embodiment of the present invention, the printing ink composition or varnish composition is formulated as offset printing ink composition or offset varnish composition. It is preferred in this embodiment that the oxymethylene ether has a boiling point at 23° C. of 200 to 350° C. The binder of the printing ink composition or varnish composition of this embodiment is preferably selected from the group consisting of rosin resins, rosin modified phenolic resins, hydrocarbon-resin modified phenol resins, hydrocarbon resins, alkyd resins, maleic modified resins, polyesters, rosins, rosin esters, dimerized and polymerized rosins, rosin modified fumaric resins, phenolic resins, terpenes, polyamides, acrylics, modified hydrocarbon resins, styrenes, styrene modified resins, urethane modified resins, urethanes, tall oil based resins, tallic resins and arbitrary combinations of two or more of the aforementioned binders. Particularly preferred are rosin resins, rosin modified phenolic resins, hydrocarbon-resin modified phenol resins, hydrocarbon resins, alkyd resins, maleic modified resins, rosins, rosin esters, dimerized and polymerized rosins, rosin modified fumaric resins, phenolic resins, terpenes, acrylics, modified hydrocarbon resins, styrenes, styrene modified resins, tall oil based resins and tallic resins.

In accordance with a further particular preferred embodiment of the present invention, the solvent component of the printing ink composition or varnish composition of the present invention comprises one or more oxymethylene ethers each having the general formula (I), wherein n is an integer of 5 to 7. In other words, in this embodiment the solvent component comprises one oxymethylene ether having the general formula (I) with n being an integer of 5, 6 or 7 or a mixture of two or more oxymethylene ethers each of which having the general formula (I) with n being an integer of 5 to 7, such as a mixture of oxymethylene ether with n being 5 and oxymethylene ether with n being 6 or a mixture of oxymethylene ether with n being 6 and oxymethylene ether with n being 7 or a mixture of oxymethylene ether with n being 5, oxymethylene ether with n being 6 and oxymethylene ether with n being 7.

For instance, in this embodiment the solvent component of the printing ink composition or varnish composition of the present invention comprises at least 60% by weight, preferably 60 to 99% by weight, and more preferably at least 80%, preferably 80 to 99% by weight, by weight of at least one oxymethylene ether and remainder to 100% by weight of one or more solvents being different from oxymethylene ether, wherein the at least one oxymethylene ether comprises at least 60% by weight, preferably at least 80% by weight, more preferably at least 90% by weight and most preferably consists of one or more oxymethylene ethers each having the general formula (I), wherein n is an integer of 5 to 7. Thus, in this variant of the embodiment, the solvent component may include up to 40% by weight or up to 20% by weight, such as 1 to 40% by weight or 1 to 20% by weight of one or more solvents being different from oxymethylene ether. However, it is preferred that the solvent does not contain any cyclic ester, any oxyethylene dialkylether or any oxypropylene dialkylether. In turn, the oxymethylene ether part of the solvent component includes up to 40% by weight or up to 20% by weight or up to 10% by weight or 0% by weight of one or more oxymethylene ethers being different from oxymethylene ether having the general formula (I), wherein n is an integer of 5 to 7, such as an oxymethylene dialkyl ether having the general formula (I), however with n being less than 5 or more than 8, or an oxymethylene diethyl ether, an oxymethylene dipropyl ether or an oxymethylene dibutyl ether.

However, it is more preferred that the solvent component of this embodiment consists of at least one oxymethylene ether, wherein it comprises at least 80% by weight or more preferably at least 90% by weight of one or more oxymethylene ethers each having the general formula (I), wherein n is an integer of 5 to 7. Thus, in this variant of the embodiment, the solvent component only comprises as solvent one or more oxymethylene ethers, wherein at least 80% by weight or at least 90% by weight of the one or more oxymethylene ethers have the general formula (I), wherein n is an integer of 5 to 7. The remainder to 100% by weight of the solvent component may be one or more oxymethylene ethers having the general formula (I), wherein n is an integer of 2 to 4 or of at least 8, an oxymethylene diethyl ether, an oxymethylene dipropyl ether or an oxymethylene dibutyl ether.

Even more preferably, the solvent component of this embodiment consists of one or more oxymethylene ethers, wherein all of the one or more oxymethylene ethers have the general formula (I), wherein n is an integer of 5 to 7. Thus, in this variant of the embodiment, the solvent component only comprises as solvent one or more oxymethylene ethers, wherein none of the oxymethylene ethers has in general formula (I) an n being different from 5 to 7.

This embodiment, in which the solvent component comprises one or more oxymethylene ethers each having the general formula (I), wherein n is an integer of 5 to 7, is particularly suitable for printing ink compositions or varnish compositions, which are designed for sheet-fed offset printing, web offset printing or intaglio printing. Preferably, the boiling point of the solvent component is in this embodiment more than 242° C. If pigment is contained, the content thereof is preferably at most 28% by weight based on the total weight of the printing ink composition or varnish composition.

In particular in the case that the printing ink composition or varnish composition is designed for being used in sheet-fed offset printing or web offset printing it is preferred that the binder component of the printing ink composition or varnish composition according to this embodiment comprises binder being selected from the group consisting of rosin resins, rosin modified phenolic resins, hydrocarbon-resin modified phenol resins, hydrocarbon resins, alkyd resins, maleic modified resins, polyesters, rosins, rosin esters, dimerized and polymerized rosins, rosin modified fumaric resins, phenolic resins, terpenes, polyamides, acrylics, modified hydrocarbon resins, styrenes, styrene modified resins, urethane modified resins, urethanes, tall oil based resins, tallic resins and arbitrary combinations of two or more of the aforementioned binders. Also preferred are those resins, which are those identified in The Printing Ink Manual, which is incorporated herein by reference. Particularly preferred are rosin resins, rosin modified phenolic resins, hydrocarbon-resin modified phenol resins, hydrocarbon resins, alkyd resins, maleic modified resins, rosins, rosin esters, dimerized and polymerized rosins, rosin modified fumaric resins, phenolic resins, terpenes, acrylics, modified hydrocarbon resins, styrenes, styrene modified resins, tall oil based resins and tallic resins. If a part of the solvent component comprises solvents being different from oxymethylene ether, it is preferably selected for a sheet-fed offset printing ink/varnish from vegetable oils and fatty acid esters and for a web offset printing ink/varnish from mineral oils, vegetable oils and fatty acid esters. The preferred total solvent content is 30 to 60% for a sheet-fed offset printing ink/varnish and 30 to 70% for a web offset printing ink/varnish.

If the printing ink composition or varnish composition is designed for being used in intaglio printing it is preferred that the binder component of the printing ink composition or varnish composition according to this embodiment comprises binder being selected from the group consisting of rosin modified phenolic resins, alkyd resins, maleic modified resins, polyesters, rosin esters, dimerized and polymerized rosins, rosin modified fumaric resins, phenolic resins, styrene modified resins, urethane modified resins, urethanes, tall oil based resins, tallic resins and arbitrary combinations of two or more of the aforementioned binders. Also preferred are those resins, which are those identified in The Printing Ink Manual, which is incorporated herein by reference. If a part of the solvent component comprises solvents being different from oxymethylene ether, it is preferably selected from mineral oils, vegetable oils, fatty acid esters and polyglycols. The preferred total solvent content is 5 to 15%.

Preferably, the printing ink composition or varnish composition according to this embodiment which is suitable for web offset comprises 10 to 40% by weight of the binder and for sheet-fed offset and intaglio printing 20 to 40% by weight of the binder.

Alternatively, the solvent component of the printing ink composition or varnish composition of the present invention comprises one or more oxymethylene ethers each having a weight average molecular weight of 196 to 256 g/mol. All numeric value ranges and specifics about binders and printing techniques mentioned above for the embodiment for oxymethylene ethers each having the general formula (I), wherein n is an integer of 5 to 7, are also preferred for this embodiment characterized by a weight average molecular weight of 196 to 256 g/mol.

In accordance with an alternative particular preferred embodiment of the present invention, the solvent component of the printing ink composition or varnish composition of the present invention comprises one or more oxymethylene ethers each having the general formula (I), wherein n is an integer of 3 to 5. In other words, in this embodiment the solvent component comprises one oxymethylene ether having the general formula (I) with n being an integer of 3, 4 or 5 or a mixture of two or more oxymethylene ether each of which having the general formula (I) with n being an integer of 3 to 5, such as a mixture of oxymethylene ether with n being 3 and oxymethylene ether with n being 4 or a mixture of oxymethylene ether with n being 3 and oxymethylene ether with n being 5 or a mixture of oxymethylene ether with n being 3, oxymethylene ether with n being 4 and oxymethylene ether with n being 5.

In accordance with an alternative particular preferred embodiment of the present invention, the solvent component of the printing ink composition or varnish composition of the present invention comprises one or more oxymethylene ethers each having the general formula (I), wherein n is an integer of 2 to 4. In other words, in this embodiment the solvent component comprises one oxymethylene ether having the general formula (I) with n being an integer of 2, 3 or 4 or a mixture of two or more oxymethylene ether each of which having the general formula (I) with n being an integer of 2 to 4, such as a mixture of oxymethylene ether with n being 2 and oxymethylene ether with n being 3 or a mixture of oxymethylene ether with n being 2 and oxymethylene ether with n being 4 or a mixture of oxymethylene ether with n being 2, oxymethylene ether with n being 3 and oxymethylene ether with n being 4.

For instance, in this embodiment the solvent component of the printing ink composition or varnish composition of the present invention comprises at least 25% by weight, more preferably at least 50% by weight, even more preferably at least 60% by weight, such as 60 to 99% by weight, and still more preferably at least 80%, such as 80 to 99% by weight of at least one oxymethylene ether and remainder to 100% by weight of one or more solvents being different from oxymethylene ether, wherein the at least one oxymethylene ether comprises at least 60% by weight, preferably at least 80% by weight, more preferably at least 90% by weight and most preferably consists of one or more oxymethylene ethers each having the general formula (I), wherein n is an integer of 2 to 4. However, it is preferred that the solvent does not contain any cyclic ester, any oxyethylene dialkylether or any oxypropylene dialkylether. Thus, in this variant of the embodiment, the solvent component may include up to 75% by weight, up to 50% by weight, up to 40% by weight or up to 20% by weight, such as 1 to 40% by weight or 1 to 20% by weight of one or more solvents being different from oxymethylene ether. In turn, the oxymethylene ether part of the solvent component includes up to 40% by weight or up to 20% by weight or up to 10% by weight or 0% by weight of one or more solvents being different from oxymethylene ether having the general formula (I), wherein n is an integer of 2 to 4, such as an oxymethylene dialkyl ether having the general formula (I), however with n being more than 4, or an oxymethylene diethyl ether, an oxymethylene dipropyl ether or an oxymethylene dibutyl ether.

However, it is more preferred that the solvent component of this embodiment consists of at least one oxymethylene ether, wherein it comprises at least 80% by weight or more preferably at least 90% by weight of one or more oxymethylene ethers each having the general formula (I), wherein n is an integer of 2 to 4. Thus, in this variant of the embodiment, the solvent component only comprises as solvent one or more oxymethylene ethers, wherein at least 80% by weight or at least 90% by weight of the one or more oxymethylene ethers have the general formula (I), wherein n is an integer of 2 to 4. The remainder to 100% by weight of the solvent component may be one or more oxymethylene ethers having the general formula (I), wherein n is an integer of at least 5, an oxymethylene diethyl ether, an oxymethylene dipropyl ether or an oxymethylene dibutyl ether.

Even more preferably, the solvent component of this embodiment consists of one or more oxymethylene ethers, wherein all of the one or more oxymethylene ethers have the general formula (I), wherein n is an integer of 2 to 4. Thus, in this variant of the embodiment, the solvent component only comprises as solvent one or more oxymethylene ethers, wherein none of the oxymethylene ethers has in general formula (I) an n being different from 2 to 4.

This embodiment, in which the solvent component comprises one or more oxymethylene ethers each having the general formula (I), wherein n is an integer of 2 to 4, is particularly suitable for printing ink composition or varnish compositions, which are designed for flexographic printing or gravure printing. Preferably, the boiling point of the solvent component is in this embodiment between 122 and 201° C. If pigment is contained, the content thereof is preferably at most 35% by weight based on the total weight of the printing ink composition or varnish composition.

In particular in the case that the printing ink composition or varnish composition is designed for being used in flexographic printing or gravure printing it is preferred that the binder component of the printing ink composition or varnish composition according to this embodiment comprises binder being selected from the group consisting of nitrocelluloses, polyurethanes, polyurea polyurethanes, ketonic resins, maleic resins, polyamides, polyvinyl butyrates, polyvinyl chlorides, cellulose acetate butyrate CAB, cellulose acetate propionate CAP, polyesters, shellac, polyvinyl ether, polyol/isocyanate combinations, ethylcellulose, acrylate resins, styrene acrylate resins, polyvinyl alcohols, vinyl acetate copolymers and arbitrary combinations of two or more of the aforementioned binders. If a part of the solvent component comprises solvents being different from oxymethylene ether, it is preferably selected from ethanol, ethyl acetate, propanol, propyl acetate, ethyl lactate, ethoxypropanol and methoxypropanol.

Preferably, the printing ink composition or varnish composition according to this embodiment comprises 10 to 25% by weight of the binder component and 60 to 88% by weight of the solvent component.

All numbers mentioned afore and subsequently with respect to the content of binder, solvent and pigment refer to inks and varnishes, that are diluted with solvent(s) to a print viscosity of 18 to 22 second in a DIN 4 Cup in terms of flexographic printing and 18 to 26 seconds in a DIN 3 Cup in terms of gravure printing.

Alternatively, the solvent component of the printing ink composition or varnish composition of the present invention comprises one or more oxymethylene ethers each having a weight average molecular weight of 106 to 166 g/mol. All numeric value ranges and specifics about binders and printing techniques mentioned above for the embodiment for oxymethylene ethers each having the general formula (I), wherein n is an integer of 2 to 4, are also preferred for this embodiment characterized by a weight average molecular weight of 106 to 166 g/mol.

In accordance with an alternative particular preferred embodiment of the present invention, the solvent component of the printing ink composition or varnish composition of the present invention comprises one or more oxymethylene ethers each having the general formula (I), wherein n is an integer of 2 to 3. In other words, in this embodiment the solvent component comprises one oxymethylene ether having the general formula (I) with n being an integer of 2 or 3 or a mixture of oxymethylene ether with n being 2 and oxymethylene ether with n being 3.

For instance, in this embodiment the solvent component of the printing ink composition or varnish composition of the present invention comprises at least 60% by weight, such as 60 to 99% by weight, and more preferably at least 80% by weight, such as 80 to 99% by weight, of at least one oxymethylene ether and remainder to 100% by weight of one or more solvents being different from oxymethylene ether, wherein the at least one oxymethylene ether comprises at least 60% by weight, preferably at least 80% by weight, more preferably at least 90% by weight and most preferably consists of one or more oxymethylene ethers each having the general formula (I), wherein n is an integer of 2 to 3. Thus, in this variant of the embodiment, the solvent component may include up to 40% by weight or up to 20% by weight, such as 1 to 40% by weight or 1 to 20% by weight of one or more solvents being different from oxymethylene ether. However, it is preferred that the solvent does not contain any cyclic ester, any oxyethylene dialkylether or any oxypropylene dialkylether. In turn, the oxymethylene ether part of the solvent component includes up to 40% by weight or up to 20% by weight or up to 10% by weight or 0% by weight of one or more oxymethylene ethers being different from oxymethylene ether having the general formula (I), wherein n is an integer of 2 to 3, such as an oxymethylene dialkyl ether having the general formula (I), however with n being more than 3, or an oxymethylene diethyl ether, an oxymethylene dipropyl ether or an oxymethylene dibutyl ether.

However, it is more preferred that the solvent component of this embodiment consists of at least one oxymethylene ether, wherein it comprises at least 80% by weight or more preferably at least 90% by weight of one or more oxymethylene ethers each having the general formula (I), wherein n is an integer of 2 to 3. Thus, in this variant of the embodiment, the solvent component only comprises as solvent one or more oxymethylene ethers, wherein at least 80% by weight or at least 90% by weight of the one or more oxymethylene ethers have the general formula (I), wherein n is an integer of 2 to 3. The remainder to 100% by weight of the solvent component may be one or more oxymethylene ethers having the general formula (I), wherein n is an integer of at least 4, an oxymethylene dipropyl ether or an oxymethylene dibutyl ether.

Even more preferably, the solvent component of this embodiment consists of one or more oxymethylene ethers, wherein all of the one or more oxymethylene ethers have the general formula (I), wherein n is an integer of 2 to 3. Thus, in this variant of the embodiment, the solvent component only comprises as solvent one or more oxymethylene ethers, wherein none of the oxymethylene ethers has in general formula (I) an n being different from 2 to 3.

This embodiment, in which the solvent component comprises one or more oxymethylene ethers each having the general formula (I), wherein n is an integer of 2 to 3, is particularly suitable for printing ink composition or varnish compositions, which are designed for publication gravure printing or screen printing. Preferably, the boiling point of the solvent component is in this embodiment between 122 and 201° C. If pigment is contained, the content thereof is preferably at most 50% by weight based on the total weight of the printing ink composition or varnish composition.

In particular in the case that the printing ink composition or varnish composition is designed for being used in publication gravure printing it is preferred that the binder component of the printing ink composition or varnish composition according to this embodiment comprises binder being selected from the group consisting of phenolic resins, hydrocarbon resins, Ca/Mg-resinates, dammar, shellac, terpene resins, asphalt, Li-, Na-, K-, Mg-, Ca- or Zn-compounds, maleic resins, polyvinyl chloride, alkyde tall oil based resins, rosin esters, amino polyester resins, ethylcellulose, amino acrylic resins and arbitrary combinations of two or more of the aforementioned binders.

If the printing ink composition or varnish composition is designed for being used in screen printing it is preferred that the binder component of the printing ink composition or varnish composition according to this embodiment comprises binder being selected from the group consisting of rosin resins, rosin modified phenolic resins, hydrocarbon-resin modified phenol resins, hydrocarbon resins, alkyd resins, maleic modified resins, polyesters, rosins, rosin esters, dimerized and polymerized rosins, rosin modified fumaric resins, phenolic resins, terpenes, polyamides, acrylics, modified hydrocarbon resins, styrenes, styrene modified resins, urethane modified resins, urethanes, tall oil based resins, tallic resins and arbitrary combinations of two or more of the aforementioned binders. Also preferred are those resins, which are those identified in The Printing Ink Manual, which is incorporated herein by reference. If a part of the solvent component comprises solvents being different from oxymethylene ether, it is preferably selected from mineral oils and esters.

Alternatively, the solvent component of the printing ink composition or varnish composition of the present invention comprises one or more oxymethylene ethers each having a weight average molecular weight of 106 to 136 g/mol. All numeric value ranges and specifics about binders and printing techniques mentioned above for the embodiment for oxymethylene ethers each having the general formula (I), wherein n is an integer of 2 to 3, are also preferred for this embodiment characterized by a weight average molecular weight of 106 to 136 g/mol.

All numbers mentioned afore and subsequently with respect to the content of binder, solvent and pigment refer to inks and varnishes, that are diluted to a print viscosity of 18 to 25 seconds in a DIN 3 Cup in terms of publication gravure printing.

In addition, the printing ink composition or varnish composition of the present invention may be designed as an oil-based inkjet or as a solvent based inkjet ink or varnish.

In accordance with another aspect, the present invention relates to the use of an afore-described printing ink composition or varnish composition in a printing method being selected from the group consisting of offset printing, lithography printing, intaglio printing, flexographic printing, gravure printing, screen printing, digital printing, inkjet printing, pad printing, transfer printing, oil-based inkjet printing, solvent based inkjet printing and letter printing. Most preferably, the printing ink composition or varnish composition is used in offset printing.

The invention claimed is:

1. An offset printing ink composition or an offset varnish composition, each composition containing a binder component and a solvent component, wherein the solvent component of each composition comprises at least one oxymethylene ether, wherein the solvent component of each composition comprises as the oxymethylene ether at least one oxymethylene ether according to the general formula (I):

$$CH_3[OCH_2]_nOCH_3 \quad (I)$$

wherein n is an integer of 2 to 7 and the solvent component of each composition comprises 60 to 99% by weight of the at least one oxymethylene ether according to formula (I) and the remainder of one or more solvents being different from oxymethylene ether, wherein the at least one oxymethylene ether according to formula (I) comprises at least 60% by weight of one or more oxymethylene ethers each having the general formula (I), wherein n is an integer of 5 to 7 or n is an integer of 2 to 4.

2. The printing ink composition or the varnish composition according to claim 1, wherein the solvent component of each composition comprises an oxymethylene ether according to formula (I) having a boiling point at 23° C. of 200 to 350° C.

3. The printing ink composition or the varnish composition according to claim 1, wherein the solvent component of each composition comprises an oxymethylene ether according to formula (I) having a weight average molecular weight of 106 to 256 g/mol.

4. The printing ink composition or the varnish composition according to claim 1, wherein each composition comprises 5 to 90% by weight of its respective solvent component based on the total weight of the printing ink composition or varnish composition at print viscosity, wherein the solvent component of each composition comprises at least 20% by weight of the at least one oxymethylene ether according to formula (I).

5. The printing ink composition or the varnish composition according to claim 1, wherein the solvent component of each composition consists of the at least one oxymethylene ether according to formula (I).

6. The printing ink composition or the varnish composition according to claim 1, wherein each composition comprises 10 to 70% by weight of its respective binder component based on the total weight of the printing ink composition or varnish composition at print viscosity, wherein the binder component of each composition comprises a binder selected from the group consisting of polyesters, polyethers, polyurethanes, urethane-modified resins, polyamide resins, polyacrylates, maleic resins, rosin modified fumaric resins, collophonium resins, dimerized and polymerized rosins, rosin esters, tallic resins, tall oil based resins, ketonic resins, aldehyde resins, alkyd resins, collophonium modified phenolic resins, hydrocarbon-resin modified phenolic resins, hydrocarbon resins, modified hydrocarbon resins, maleic modified resins, silicates, silicones, phenolic resins, urea urethane resins, melamine resins, epoxy resins, polyterpene resins, shellac, copal, dammar, lignin derivatives, natural resins, poly-vinylalcohols, polyvinylethers, polyvinylacetates, vinylacetate copolymers, polyvinylchlorides, polyvinylpropionates, polyvinylbutyrates, polymethacrylates, polystyrenes, styrene-modified resins, styreneacrylate resins, polyolefines, coumarone-indene resins, aromatic formaldehyde resins, carbamide acid resins, sulfonamide resins, chlorinated resins, nitrocellulose, ethylcellulose, CAB (cellulose acetate butyrate), CAP (cellulose acetate propionate), cellulose compounds, acrylate resins, amino acrylic resins, aminopolyester resins, asphalt, Ca/Mg resinates, rubbers, polysaccharides, polyol/iscocyanate compounds, temperature curing resins and arbitrary combinations of two or more of the aforementioned binders.

7. The printing ink composition or the varnish composition according to claim 1, wherein the composition is the printing ink composition, wherein the printing ink composition comprises 1 to 50% by weight of one or more pigments.

8. The printing ink composition or the varnish composition according to claim 1, wherein the binder component of each composition comprises a binder selected from the group consisting of rosin resins, rosin modified phenolic resins, hydrocarbon-resin modified phenol resins, hydrocarbon resins, alkyd resins, maleic modified resins, polyesters, rosins, rosin esters, dimerized and polymerized rosins, rosin modified fumaric resins, phenolic resins, terpenes, polyamides, acrylics, modified hydrocarbon resins, styrenes, styrene modified resins, urethane modified resins, urethanes, tall oil based resins, tallic resins and arbitrary combinations of two or more of the aforementioned binders, wherein each composition comprises 10 to 40% by weight of its respective binder component and 30 to 70% by weight of its respective solvent component or comprises 20 to 40% by weight of its respective binder component and 30 to 60% by weight of its respective solvent component.

9. The printing ink composition or the varnish composition according to claim 1, wherein the binder component of each composition comprises a binder selected from the group consisting of nitrocelluloses, polyurethanes, polyurea polyurethanes, ketonic resins, maleic resins, polyamides, polyvinyl butyrates, polyvinyl chlorides, CAB, CAP, polyesters, shellac, polyvinylether, polyol/isocyanate compounds, ethylcellulose, acrylic resins, styrene acrylate resins, polyvinyl alcohols, vinyl acetate copolymers and arbitrary combinations of two or more of the aforementioned binders, wherein each composition comprises 10 to 25% by weight of its respective binder component and 60 to 88% by weight of its respective solvent component.

10. The printing ink composition or the varnish composition according to claim 1, wherein the solvent component of each composition comprises 60 to 99% by weight of the at least one oxymethylene ether according to formula (I) and remainder of one or more solvents being different from oxymethylene ether, wherein the at least one oxymethylene ether according to formula (I) comprises at least 60% by weight of one or more oxymethylene ethers each having the general formula (I), wherein n is an integer of 2 to 3.

11. A printing method comprising using the printing ink composition or the varnish composition according to claim 1 in offset printing.

* * * * *